A. H. BALLARD.
APPARATUS FOR BAKING.
APPLICATION FILED NOV. 12, 1921.
1,434,036.
Patented Oct. 31, 1922.
3 SHEETS—SHEET 1.
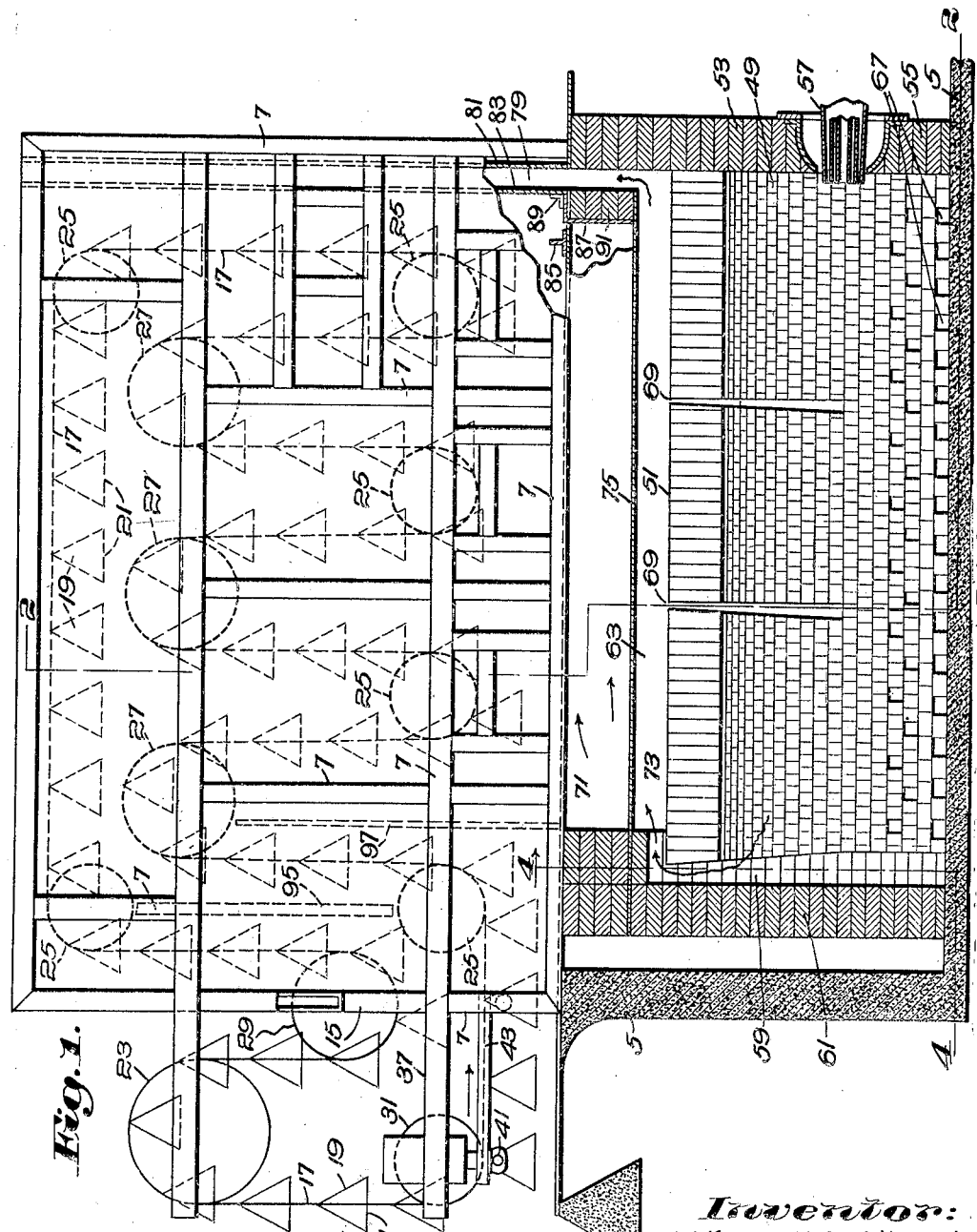

A. H. BALLARD.
APPARATUS FOR BAKING.
APPLICATION FILED NOV. 12, 1921.
1,434,036.
Patented Oct. 31, 1922.
3 SHEETS—SHEET 2.
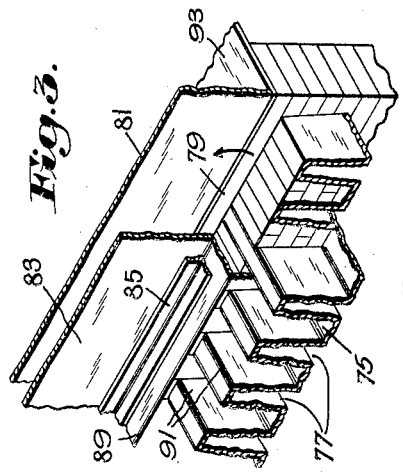
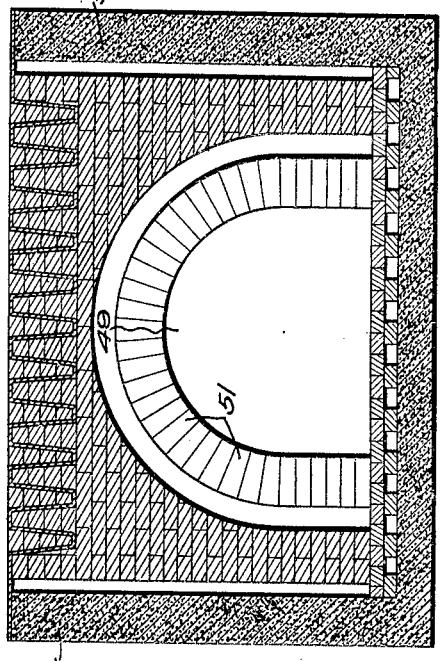
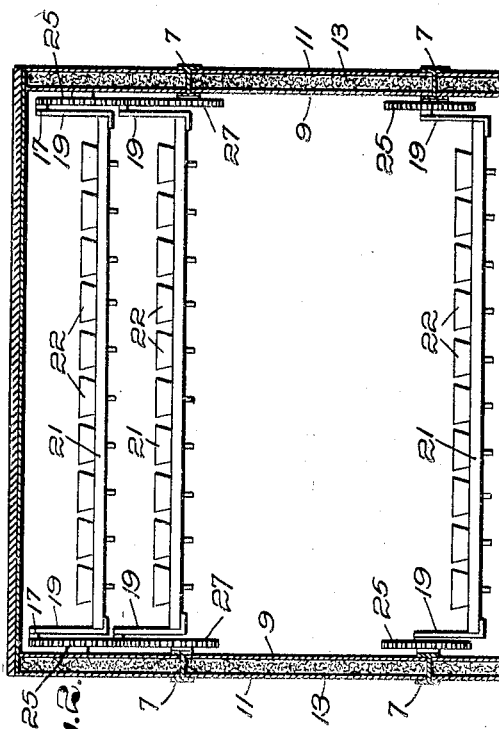
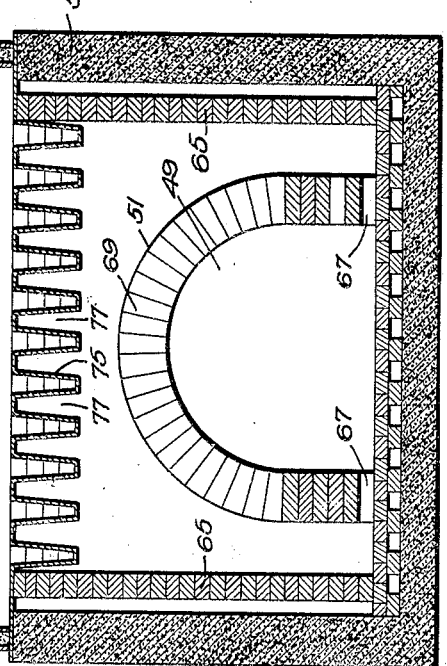
Inventor:
Arthur H. Ballard.
by Emery Booth Janney Varney
Attys.

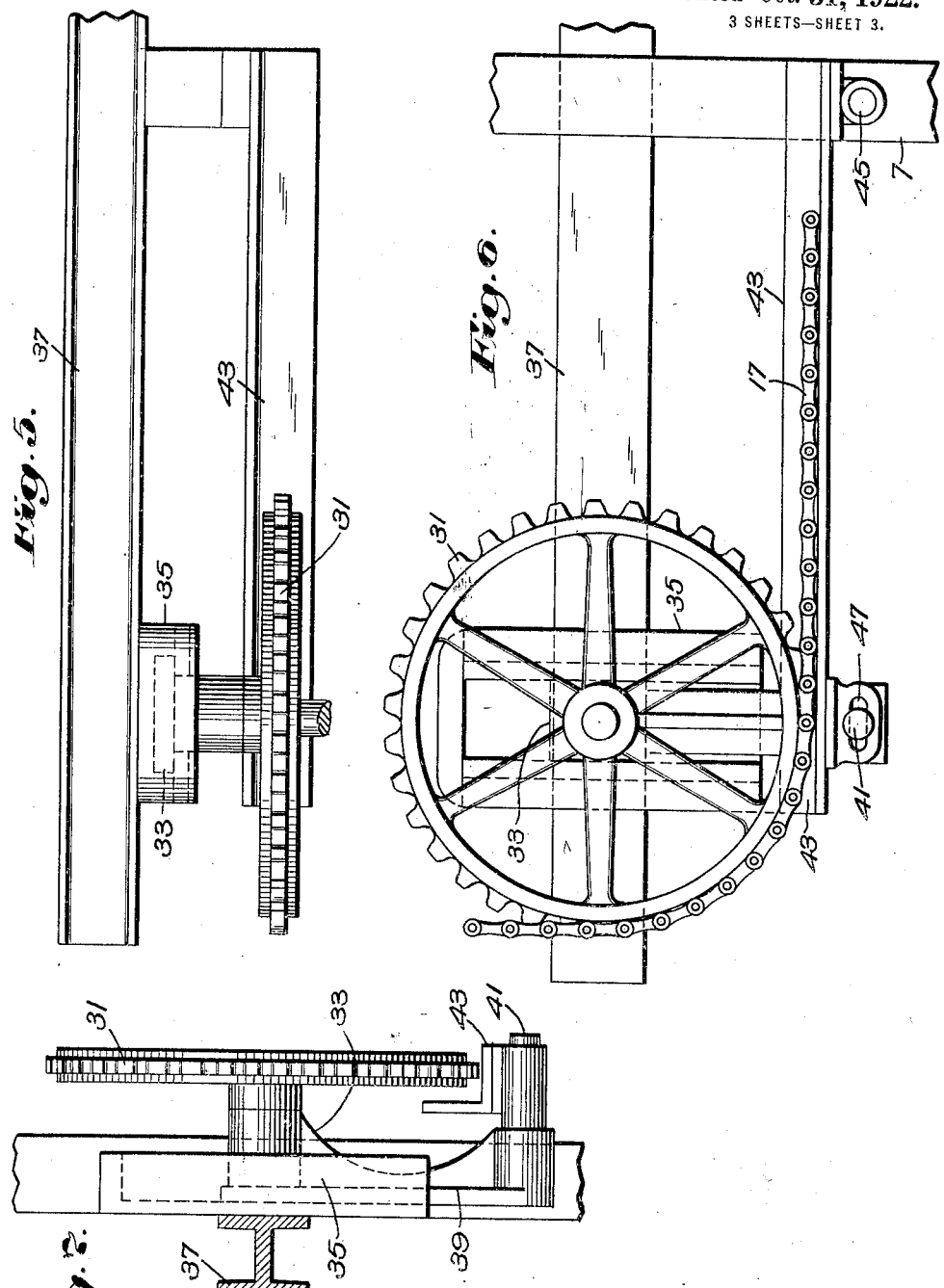

Patented Oct. 31, 1922.

1,434,036

UNITED STATES PATENT OFFICE.

ARTHUR H. BALLARD, OF BOSTON, MASSACHUSETTS, ASSIGNOR TO BALLARD OVEN CORPORATION, OF BOSTON, MASSACHUSETTS, A CORPORATION OF MASSACHUSETTS.

APPARATUS FOR BAKING.

Application filed November 12, 1921. Serial No. 514,614.

*To all whom it may concern:*

Be it known that I, ARTHUR H. BALLARD, a citizen of the United States, and a resident of Boston, county of Suffolk, and State of Massachusetts, have invented an Improvement in Apparatus for Baking, of which the following description, in connection with the accompanying drawings, is a specification, like characters on the drawings representing like parts.

This invention consists in improvements in apparatus for baking, one object being to provide in a relatively small space a baking oven of the continuous type having a large capacity.

For illustrative purposes the invention is herein shown as embodied in a bread baking oven of relatively small dimensions and covering a relatively small area, but provided with a traveling conveyor of large capacity on which the loaves are conveyed into, through and out of the oven, the length of the conveyor exposed to the heat of the oven being relatively great as compared to the cross-sectional area of the baking chamber. In the illustrated form of oven indirect heating is utilized, that is to say, the products of combustion are kept out of direct contact with the material which is conveyed through the oven, but are employed to heat properly located conductive radiating surfaces of adequate area so arranged with relation to the combustion chamber that the products of combustion may be suitably diffused or distributed thereover to effectively heat the oven to the required temperature.

The invention will be best understood by reference to the following description when taken in connection with the accompanying illustration of one specific embodiment of the apparatus, while its scope will be more particularly pointed out in the appended claims.

In the drawings,—

Fig. 1 is a side elevation partly in section showing an oven embodying one form of the invention;

Fig. 2 is a transverse sectional elevation on the line 2—2 in Fig. 1;

Fig. 3 is a detail in perspective showing the connection of the upright exit flue to the horizontal channel flues and to the heating space beneath the baking chamber;

Fig. 4 is a sectional elevation on the line 4—4 in Fig. 1 of that portion of the oven below the baking chamber showing the arrangement of the deflecting arch and the oven floor;

Fig. 5 is a plan view of the conveyor tensioning device;

Fig. 6 is a side elevation; and

Fig. 7 an end elevation of the same.

Referring to the drawings and to the embodiment of the invention therein illustrated, the baking chamber is contained within a structure herein shown as erected on a masonry setting 5, within which said setting is located the combustion chamber 49. The oven structure is composed of horizontal and vertical frame members 7 which may be of structural steel and provide support on the four sides and top for heat insulating walls. Herein such walls are constructed (Fig. 2) by providing a series of inner panels 9 and outer panels 11 formed by sheet metal, with an intermediate insulating filling 13 of any suitable material or materials such as asbestos or the like. The baking chamber is preferably closed against the escape of heat except where provision is made for the entrance and exit of the traveling conveyor, this being provided for in the present case by cutting away the lower part of the front wall thereof, as indicated in Fig. 1, leaving an opening 15 of sufficient size to permit the passage of the conveyor into the oven through the lower part of the opening and its exit therefrom to the upper part thereof. As hereinafter described, suitable provision is made at this entrance-exit opening to oppose the escape of heat therethrough.

The traveling conveyor may be of any suitable construction but herein consists of a pair of chains 17 to each of which are jointed at suitable separated intervals depending supports 19, there being suspended between each pair of supports a carrier tray 21 serving to hold the pans 22 or other receptacles in which the individual loaves of bread or other materials to be baked are carried through the oven.

The conveyor chains may be driven at any suitable point as by the driving sprockets 23 located at the exit end of the oven, any suitable driving power being utilized such as a motor and gearing (not shown) designed to give the required rate of feed to the conveyor.

The sprocket chains are guided at suitable intervals within the oven by guiding sprockets 25 journaled on the inner walls of the oven chamber and so located as to guide the conveyor in a circuitous path which doubles or returns on itself preferably a number of times so as to expose within the relatively small space of the baking chamber a considerable length of conveyor.

Referring to Fig. 1, it will be seen that the conveyor enters the oven chamber in a horizontal path through the opening 15 at the bottom thereof, passing around the guiding sprockets 25, and is then directed into a vertical path. After passing over a pair of larger guiding sprockets 27 near the upper part of the chamber, it takes a downward path until it reaches the bottom of the chamber, whereupon it passes over another pair of sprockets 25 and again assumes an upward path. This is repeated a number of times until the length of the baking chamber has been traversed, whereupon the conveyor engages the guiding sprockets 25 near the top of the oven and is directed in a substantially horizontal path near the top of the oven back to the forward end thereof, and thence down and out of the entrance-exit opening 15, passing around the guiding sprocket 29 thereat. Each carrier tray, being suspended from a point above its center of gravity, maintains the same upright position at all times irrespective of the direction of the travel of the conveyor. Guide supports to engage the ends of the trays with the chains themselves may be provided in the form of fixed guide plates or rods (not shown) at the sides of the baking chamber or any other suitable means may be employed to prevent the carrier from sagging in its upper horizontal path under the weight of the bread.

When the oven is heated a considerable expansion takes place in the parts of the conveyor tending to slacken the same. In order to maintain the required tension in the conveyor at all times I have provided means for automatically tensioning the conveyor or taking up the slack therein, such means being controlled by the weight of the material carried by the conveyor. For this purpose the conveyor chains, after leaving the driving sprocket 23 and before entering the entrance-exit opening 15, pass down and around the guiding sprockets 31, the latter serving as tensioning guides and automatically moving up or down under the weight of the trays as the chains shorten or lengthen. For this purpose each sprocket wheel 31 (see Figs. 5 to 7 inclusive) is journaled in a block 33 adapted to move up and down in guideways 35, the latter rigidly fastened to the projecting portion 37 of one of the frame members 7. The bearing block 33 has a depending arm 39 which carries at its lower end a pin 41 extending laterally beneath the sprocket wheel 31, this pin serving to support the end of an angle iron 43. The opposite end of the angle iron receives pivotal support at 45 on one of the upright frame members 7 and has its horizontal face underlying the sprocket chain 17 and serving as a guide rest therefor. If the chains expand and lengthen, the weight of the trays suspended by the horizontal stretch of conveyor entering the oven tends to swing down the free end of the angle iron 43 and with it draws down the guide sprocket 31, thus automatically taking up the slack in the conveyor as rapidly as it develops. The pin 41 works within a slot 47 below the angle iron so as to permit the necessary relative movement between these two parts.

Referring now to the generation of heat and the provision for applying heat to the bread as it is conveyed through the baking chamber, the combustion chamber 49 is enclosed by refractory walls presented by the brick arch 51. The rear end of the chamber is closed by the refractory wall 53 having one or more air admission ports 55 and having also projecting through it and into the combustion chamber the crude oil burner 57, which may be of any usual or ordinary type, and provided with well-known devices (not shown) for varying the relative supply of air and oil so that the temperature of the oven may be regulated to the requirements of the materials being baked. The opposite end of the combustion chamber opens into a combustion space 59 formed by the brick wall 61 and opening into a heating chamber 63 which overlies the arch 51 and underlies the floor 75 of the baking chamber. The sides of the heating chamber 63 are formed by refractory walls 65 (Fig. 2) on the top of which the oven floor rests.

To distribute the high temperature products of combustion uniformly to the radiating surfaces of the baking chamber without overheating, the combustion chamber 49 is preferably tapped at intervals throughout its length. Any suitable arrangement of exit passages may be provided, but herein the arch is provided not only with lateral distributing openings 67 but is also provided with elongated slotted ports 69 to pass a portion of the heated gases directly into the heating chamber 63. Herein the ports 69 extend entirely across the crown of the arch, as indicated in Figs. 1 and 2, but are gradually narrowed as the top of the arch is approached, as shown in Fig. 1, thus reducing the cross-sectional area of the port at the top and insuring a more uniform distribution of the gases to the floor surface of the baking chamber. At its open end the top of the arch is also extended somewhat into the combustion space 59 so as to reduce the area of the passage near the top and compel the gases to distribute laterally in passing from the combustion space 59 into the heating chamber 63. Directly over the open end of the arch the brick work of the bridge wall 61 is extended to form a wall 71 which encircles the end of the arch 51 but provides a relatively narrow throat or passage 73 through which the hot gases pass from the combustion space 59 into the heating chamber 63. This overlying brick work protects the end of the radiating floor, hereinafter described, from the direct upward impact of the hot gases in passing from the combustion space into the heating chamber.

The high temperature of the products of combustion dealt with, the relatively high temperature at which the baking oven should be kept, the rapid absorption of heat by the materials undergoing baking and being carried through the oven by the conveyor, and the relatively small condensed space of the baking chamber present a difficult problem in securing a suitably large and effectively applied radiating surface for the baking chamber. Herein I have provided an amplified radiating surface, the principal portion of which is located in the floor of the baking chamber, so that a relatively simple construction is had and at the same time an effective radiating surface is utilized which underlies the conveyor and whereby substantially all ascending radiation from the combustion chamber can be availed of in raising the heat of the baking chamber.

Herein such amplified radiating surface is provided by the floor 75 which presents, as to the portion overlying the heating chamber 63, a series of corrugations or channel-like grooves extending lengthwise the oven and the combustion chamber. This floor is preferably of sheet metal and may be constructed either in a single piece or in sections with over-lapping edges, each section including one or more channels, or it may be put together in any other desired manner. At its sides (Fig. 2) the floor is supported upon the masonry setting 5 and the brick side walls 65 of the combustion chamber, and at its forward end (Fig. 1) it is set into the brick work of the bridge wall 61 and the arch wall 71. The channels or corrugations may be made as deep as required and thereby give a greatly increased radiating surface as compared with that of a flat floor or with the cross-sectional area of the baking chamber. At the same time it presents underlying grooves or channels 77 which are open to the heating chamber 63 and to the hot gases distributed thereto from the combustion chamber, thus providing horizontal channel-like flues for the passage of such gases from one end of the heating chamber to the opposite end thereof, whereat the products of combustion are delivered to a discharge flue 79. The discharge flue 79 preferably passes through the baking chamber space, thereby providing additional radiating surface therein, and is herein shown as formed between transverse radiating plates 81, 83 which extend across the baking chamber at one end thereof, the flue chamber formed thereby being closed at the sides by plates (not shown) and connected at the top to suitable discharge flues which pass out through the top of the oven.

The floor plate 75 terminates at the upright flue passage 79 and receives support at that end from the transverse angle iron support 85 (Fig. 1). The ends of the channels or grooves on the top of the floor plate 75 are closed, as by the brick filling 87, the latter being covered by the foot plate 89 to which the upright flue plate is secured, the foot plate having a series of extensions 91 which set down into the channels and overlie the brick filling. The upright flue plate 81 is similarly secured to a foot plate 93 which rests upon the brick setting 53.

It will be seen that this construction provides the heating chamber 63 with the channel flues 77 opening at the end into the vertical flue 79, these flue passages being entirely separated from the baking chamber space. The hot gases are therefore delivered from the combustion chamber through the series of exit ports 67, 69 and 73 so that they are well distributed over the radiating floor surface and then pass up into the channel passages 77 and along the floor surface where they contact with the side and top walls of the channels maintaining the latter at a high temperature. At the end of the oven they emerge into the upright flue 79, the radiating surfaces of which absorb the remaining heat of the gases and deliver it to the baking chamber. By the described arrangement the heat of the gases is applied directly and effectively to the radiating surfaces without waste and quickly distributed over a wide area without excessive heat at any one point. On the other hand, an ample radiating surface is exposed to the gases at the most effective point to transmit the heat to the bread or other material being baked, and the radiating walls, being of high conductivity, are capable of being quickly heated and quickly cooled so that the oven may be started up when cold or cooled down when stopped in a minimum of time.

Referring to the front of the oven and the entrance-exit opening for the conveyor, there is preferably provided a vertical partition wall 95 (Fig. 1) which extends across the oven and is located between the ascending line of trays on the entering stretch of the conveyor and the descending line of trays on the exit stretch thereof. The descending line of trays moves in close proximity on one side of the partition wall 95 and on the opposite side to the front wall of the oven. On the other hand, the ascending line of trays moves in close proximity on one side to the partition wall 95 and on the opposite side to a second baffle plate or partition wall 97, also extending across the oven and extending to the oven floor. This arrangement minimizes the heat loss and opposes the escape of hot gases from the exit-entrance opening. The brick work 71 which protects the radiating floor 75 in front of the baffle plate 97 prevents heat loss through radiation at that point.

In the operation of the oven, the conveyor being driven at the desired rate of speed and adjusted according to the material to be baked and the burner having been started and regulated to get the required temperature in the baking chamber, the dough is placed on the trays either automatically or manually as the latter descend from the driving sprocket 23. The trays emerging from the oven have their baked contents discharged at the driving sprocket 23 either automatically or manually as may be desired. In passing through the oven the bread or other material on reaching the end of the first vertical stretch of the conveyor meets the full temperature of the oven and is then conducted through the circuitous path shown while exposed to a substantially uniform heat.

While I have herein shown and described for the purposes of illustration one specific form of the invention it is to be understood that the same is not limited to the mechanical details shown or the relative form or arrangement of parts, but that extensive deviations may be made therefrom and the invention may have wide application to embodiments and constructions not herein suggested all without departing from the spirit thereof.

Claims.

1. A continuous baking oven comprising in combination, a baking chamber, an endless conveyor for the materials to be baked, means for guiding the same through the chamber in an elongated path exposing to the heat of the chamber a length of conveyor relatively great as compared with the length of the chamber, a combustion chamber with refractory walls, and metallic radiating walls within the baking chamber heated by the products of combustion for the indirect heating of the material to be baked and including a metallic radiating floor for the baking chamber presenting a radiating surface of greater area than the cross-sectional area of the chamber and so related to the capacity of the conveyor as to provide heat proportioned to the materials conveyed through the chamber.

2. A continuous baking oven comprising in combination, a baking chamber, an endless traveling conveyor with carrying devices for the materials to be baked, means to guide the conveyor through the chamber in an elongated path, a combustion chamber, and a corrugated metallic radiating floor for said chamber heated by the products of combustion for the indirect heating of the materials to be baked and so related to the capacity of the conveyor as to provide heat proportioned to the materials conveyed through the chamber.

3. A continuous baking oven comprising in combination, a baking chamber, an endless conveyor, means for guiding the same through the chamber in an elongated path exposing to the heat of the chamber a length of conveyor relatively great as compared with the length of the chamber, a combustion chamber, and a radiating floor for the oven exposed on its under side to the heat of the products of combustion, said floor being corrugated or channeled to increase the radiating surface and provide channel-like passages for the products of combustion and so related to the capacity of the conveyor as to provide heat proportioned to the materials conveyed through the chamber.

4. A continuous baking oven having a baking chamber, an endless conveyor for the materials to be baked, means for guiding the same through the chamber in an elongated path exposing to the heat of the chamber a length of conveyor relatively great as compared with the length of the chamber, a combustion chamber, a heating space beneath the baking chamber to which the products of combustion are delivered, and a radiating bottom wall separating the heating space from the baking chamber, said bottom wall having an expanded radiating surface and so related to the capacity of the conveyor as to provide heat proportioned to the materials conveyed through the chamber.

5. A continuous baking oven having a baking chamber, an endless conveyor, means for guiding the same through the chamber in an elongated path exposing to the heat of the chamber a length of conveyor relatively great as compared with the length of the chamber, a combustion chamber, and a metallic bottom wall for the baking chamber having an expanded radiating surface and presenting channel-like passages on its under side for the products of combustion and so related to the capacity of the conveyor as to provide heat proportioned to the materials conveyed through the chamber.

6. A continuous baking oven having a baking chamber, an endless conveyor, a metallic bottom wall, a combustion chamber provided with refractory walls and having an end exit for discharging the products of combustion beneath said bottom wall, said exit being relatively restricted at the top to spread the products of combustion laterally.

7. A continuous baking oven having a baking chamber, an endless conveyor, a combustion chamber beneath said baking chamber and having arched refractory walls, one end of said chamber being open, and a bridge wall opposite said open end, the arched walls approaching said bridge wall near the top of the arch to restrict the exit passage thereat.

8. A continuous baking oven having a baking chamber, an endless conveyor with carrying devices for carrying materials to be baked, means to guide said conveyor through said chamber in a circuitous path exposing to the heat of the chamber a length of conveyor relatively great as compared with the length of the chamber, a metallic bottom wall, a combustion chamber having refractory walls and presenting an exit at one end thereof through which the products of combustion are discharged to heat said bottom wall, the latter being grooved or channeled to present channel-like passages for the products of combustion toward the opposite end, and an upright flue for the products of combustion at the opposite end of the bottom wall, said bottom wall being so related to the capacity of the conveyor as to provide heat proportioned to the materials conveyed through the chamber.

9. A continuous baking oven having a baking chamber, an endless conveyor with carrying devices for the materials to be baked, means for guiding the conveyor through the chamber, a tension guide with bearings in which the same is movably mounted for the purpose of regulating the tension, and a member pivotally mounted at one end and connected at the opposite end to the tension guide, said pivoted member being engaged by the conveyor and movable under the weight thereof to move the tension guide to increase the tension in the conveyor.

10. A continuous baking oven having a baking chamber, an endless conveyor with carrying devices for the materials to be baked, means for guiding said conveyor through said chamber, a guiding device movable to take up the slack in said conveyor, and a guide rest for said conveyor adapted to move under the weight of the materials carried by the conveyor and connected to said guiding device to move the latter and take up said slack.

11. A continuous baking oven having a baking chamber, an endless conveyor with carrying devices for the materials to be baked, means for guiding said carrier through said chamber, and a tension device comprising a guide member for said conveyor automatically moved by the weight of the materials carried by the conveyor for taking up the slack therein.

12. A continuous baking oven having a baking chamber, an endless conveyor, means for guiding the same through the chamber including a movable guiding device, and means actuated by the weight of the conveyor to move the same in a direction to increase the tension therein.

13. A continuous baking oven comprising in combination a baking chamber, an endless conveyor for the materials to be baked, radiating walls presenting an extended radiating area in the form of a metallic corrugated floor at the bottom of the baking chamber and of greater radiating surface than the cross-sectional areas of the chamber and presenting to the products of combustion a plurality of divided paths across the underside of the floor separated by the corrugations of the latter, a combustion chamber having refractory walls beneath the baking chamber and separated from said radiating walls by an intermediate heating space, said chamber being provided with means comprising a plurality of distributed exit openings to diffuse the products of combustion and deliver them by a plurality of separated paths to said heating space and to said radiating walls, and an upright flue at the edge of said floor to carry off the products of combustion therefrom, said upright flue also presenting radiating walls to the interior of said baking chamber.

14. A continuous baking oven comprising, in combustion, a baking chamber, an endless conveyor for the materials to be baked, radiating walls presenting an extended radiating area in the form of a corrugated floor at the bottom of the baking chamber and presenting to the products of combustion a plurality of separated and divided paths, a combustion chamber having refractory walls beneath the floor and separated therefrom by an intermediate heating space, said chamber being provided with a plurality of distributed exit openings to diffuse and deliver the products of combustion by a plurality of separated paths to said heating space, and an upright flue at a side of the baking chamber and also presenting radiating walls to the interior thereof.

15. A continuous baking oven comprising in combination, a baking chamber, an endless conveyor for the materials to be baked, radiating walls presenting an extended radiating area underlying the conveyor and of substantially greater radiating area than the cross-sectional area of the chamber and presenting to the products of combustion a plurality of separated and divided paths, a chamber having refractory walls beneath the radiating walls and separated therefrom by an intermediate heating space, said chamber being provided with means to diffuse the products of combustion and distribute the same to said heating space, and an upright flue at a side of the baking chamber to carry off the products of combustion from the bottom radiating walls and also presenting radiating walls to the interior of said baking chamber.

16. A continuous baking oven comprising in combination, a baking chamber, an endless conveyor for the materials to be baked with means for guiding the same through the chamber in an elongated path exposing to the heat of the chamber a length of conveyor relatively great as compared with the length of the chamber, radiating walls presenting an extended radiating area in the lower part of the baking chamber substantially greater than the area of the chamber and presenting to the products of combustion a plurality of separated and divided paths, means for diffusing and distributing to said radiating walls the products of combustion, and an upright flue at a side of said baking chamber to carry off the products of combustion from said radiating walls and also presenting radiating walls to the interior of said baking chamber.

17. A continuous baking oven comprising in combination, a baking chamber, an endless conveyor for the materials to be baked with means for guiding the same through the chamber in an elongated path exposing to the heat of the chamber a length of conveyor relatively great as compared with the length of the chamber, radiating walls presenting an extended radiating area in the lower part of the baking chamber substantially greater than the area of the chamber and presenting to the products of combustion a plurality of separated and divided paths, a chamber beneath the radiating walls and separated therefrom, said chamber being provided with means to diffuse the products of combustion and distribute the same to said radiating walls.

18. A continuous baking oven comprising in combination, a baking chamber, an endless conveyor for the materials to be baked with means for guiding the same through the chamber in an elongated path exposing to the heat of the chamber a length of conveyor relatively great as compared with the length of the chamber, radiating walls comprised within a bottom wall of the baking chamber, having an extended radiating area so related to the capacity of the conveyor so as to provide heat proportioned to the materials conveyed through the chamber and presenting to the products of combustion a plurality of separated and divided paths, and a chamber separated from said radiating walls and provided with means for diffusing the products of combustion and distributing the same to different parts of said radiating walls.

19. A baking oven comprising in combination, a baking chamber, an endless conveyor for the materials to be baked with means for guiding the same through the chamber in an elongated path exposing to the heat of the chamber a length of conveyor relatively great as compared with the length of the chamber, a radiating floor underlying the conveyor and exposed to the products of combustion and having an area of radiating surface substantially greater than the superficial area of the space covered by the baking chamber, said floor having a plurality of substantially horizontal flues and presenting to the products of combustion a plurality of separated and divided paths.

20. A continuous baking oven comprising in combination, a baking chamber, an endless conveyor for the materials to be baked with means for guiding the same through the chamber in an elongated path exposing to the heat of the chamber a length of conveyor relatively great as compared with the length of the chamber, a radiating floor underlying the conveyor and exposed to the products of combustion and having an area of radiating surface substantially greater than the superficial area of the space covered by the baking chamber, and a chamber separated from said radiating floor and provided with means to diffuse the products of combustion and distribute the same to different parts of said floor.

21. A baking oven comprising in combination, a baking chamber and an endless conveyor for the materials to be baked with means for guiding the same through the chamber in an elongated path exposing to the heat of the chamber a length of conveyor relatively great as compared with the length of the chamber, said baking chamber having a bottom wall, the latter provided with a plurality of substantially horizontal flues having an expanded radiating surface underlying the conveyor so related to the capacity of the conveyor as to provide heat proportioned to the materials conveyed through the chamber, said bottom wall presenting a plurality of divided paths for the products of combustion.

22. A baking oven comprising in combination, a baking chamber, an endless conveyor for the materials to be baked, with means for guiding the same through the chamber in an elongated path exposing to the heat of the chamber a length of conveyor relatively great as compared with the length of the chamber, said baking chamber having a bottom floor, the latter provided with a plurality of substantially horizontal flues having an expanded radiating surface underlying the conveyor so related to the capacity of the conveyor as to provide heat proportioned to the materials conveyed through the chamber, said bottom wall presenting a plurality of divided paths for the products of combustion, and an upright side flue connected to said horizontal flues and having also radiating surfaces exposed to the baking chamber.

23. A baking oven comprising in combination, a baking chamber, an endless conveyor for the materials to be baked with means for guiding the same through the chamber in an elongated path exposing to the heat of the chamber a length of conveyor relatively great as compared with the length of the chamber, said baking chamber being provided with a plurality of substantially horizontal flues having an expanded radiating surface and underlying the conveyor so related to the capacity of the conveyor as to provide heat proportioned to the materials conveyed through the chamber, said bottom wall presenting a plurality of divided paths for the products of combustion, a chamber underlying said baking chamber having refractory walls, and means for diffusing the products of combustion from said chamber to said horizontal flues.

24. A baking oven comprising in combination, a baking chamber, the endless conveyor 17 with trays 21, means for guiding the same through the chamber in an elongated path exposing to the heat of the chamber a length of conveyor relatively great as compared with the length of the chamber, the expanded radiating floor 75 providing extended radiating surface so related to the capacity of the conveyor as to provide heat proportioned to the materials conveyed through the chamber, and the combustion chamber 49.

25. A continuous baking oven having a baking chamber, a traveling conveyor with means for guiding the same through the chamber, a plurality of flue-like passages underlying the conveyor and presenting radiating walls to the interior of the baking chamber having an area substantially greater than the area of the chamber, said passages extending across said chamber in the direction of the travel of the conveyor and presenting divided paths to the products of combustion, a combustion chamber, and means to distribute the products of combustion from the combustion chamber to the flue passages.

26. A baking oven having a baking chamber, a traveling conveyor, means for guiding the same in an elongated path exposing to the heat of the baking chamber a length of conveyor relatively great as compared with the length of the chamber, said baking chamber being provided with a bottom wall of uneven formation to provide radiating surfaces of extended area greater than the area of the baking chamber, there being comprised within said wall flue-like passages through which the products of combustion are conducted in divided paths in contact with said radiating surfaces.

27. A baking oven having a baking chamber, a traveling conveyor, means for guiding the same in an elongated path exposing to the heat of the baking chamber a length of conveyor relatively great as compared with the length of the chamber, said baking chamber being provided with radiating surfaces underlying the conveyor, said surfaces being of uneven formation to present an extended area greater than the area of the baking chamber and said surfaces forming walls for a series of flue-like passages through which the products of combustion are conducted beneath said chamber in divided paths, and means to distribute the products of combustion to said passages.

28. A baking oven having a baking chamber, a traveling conveyor, means for guiding the same in an elongated path exposing to the heat of the baking chamber a length of conveyor relatively great as compared with the length of the chamber, a radiating bottom wall for said chamber of uneven formation to present respectively below and above the same increased heat-absorbing and heat-radiating surfaces, the latter being so related to the capacity of the conveyor as to provide heat proportioned to the materials conveyed through the chamber, said floor presenting flue-like passages extending across the same, and a separate combustion chamber beneath said radiating bottom wall from which the heated gases are distributed to the latter, said chamber having refractory walls and providing an intermediate space between the chamber and the radiating bottom wall.

In testimony whereof, I have signed my name to this specification.

ARTHUR H. BALLARD.